(12) United States Patent
Beschorner et al.

(10) Patent No.: US 9,651,067 B2
(45) Date of Patent: May 16, 2017

(54) HYDRAULIC SYSTEM WITH A DYNAMIC SEAL

(71) Applicant: Caterpillar Inc., Peoria, IL (US)

(72) Inventors: Matthew J. Beschorner, Plainfield, IL (US); Eric C. Hughes, Metamora, IL (US); Mikhail A. Sorokine, Naperville, IL (US); James A. Aardema, Plymouth, MN (US); Thomas J. Hajek, Lockport, IL (US); Aleksandra M. Egelja, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 552 days.

(21) Appl. No.: 13/947,303

(22) Filed: Jul. 22, 2013

(65) Prior Publication Data

US 2014/0034135 A1    Feb. 6, 2014

Related U.S. Application Data

(63) and a continuation-in-part of application No. 13/832,085, filed on Mar. 15, 2013.
(Continued)

(51) Int. Cl.
*F15B 13/04* (2006.01)
*F15B 19/00* (2006.01)
(Continued)

(52) U.S. Cl.
CPC ........ *F15B 19/005* (2013.01); *F15B 13/0435* (2013.01); *F15B 20/008* (2013.01);
(Continued)

(58) Field of Classification Search
CPC ...... F15B 2211/6316; F15B 2211/6355; F15B 2211/857; F15B 2211/8636; F15B 2211/8752; F15B 19/005; F15B 20/008; F15B 13/0435; F15B 2211/20546; F15B 2211/50518; F15B 2211/55; Y10T 137/0318; Y10T 137/7768;
(Continued)

(56) References Cited

U.S. PATENT DOCUMENTS 3,464,320 A * 9/1969 Richardson ............. B30B 15/16
91/420
4,194,528 A    3/1980 Kepler
(Continued)

FOREIGN PATENT DOCUMENTS

DE    4018494    12/1991
EP    2182341    5/2010
JP    2002310101    10/2002

*Primary Examiner* — Craig J Price
(74) *Attorney, Agent, or Firm* — M. Daniel Spillman (57) ABSTRACT

A system can include one or more valve arrangements with a working chamber to receive a working fluid at a first pressure, and a control chamber to receive fluid at a second pressure. A dynamic seal can be disposed on a land of a valve element. The valve arrangement may include a sleeve against which the dynamic seal is slidably engaged. The valve element may include a check stem. A pressure compensating system may be in communication with bores formed in with the valve element. A pressure system to monitor dynamic seal wear may be in communication with the control chamber of the valve arrangement.

4 Claims, 5 Drawing Sheets

Related U.S. Application Data (60) Provisional application No. 61/695,349, filed on Aug. 31, 2012, provisional application No. 61/677,744, filed on Jul. 31, 2012.

(51) Int. Cl.
*F16K 37/00* (2006.01)
*F15B 20/00* (2006.01)
*F16K 31/12* (2006.01)
*F15B 13/043* (2006.01)

(52) U.S. Cl.
CPC .......... *F16K 31/12* (2013.01); *F16K 37/0041* (2013.01); *F15B 2211/20546* (2013.01); *F15B 2211/50518* (2013.01); *F15B 2211/55* (2013.01); *F15B 2211/6316* (2013.01); *F15B 2211/6355* (2013.01); *F15B 2211/857* (2013.01); *F15B 2211/8636* (2013.01); *F15B 2211/8752* (2013.01); *Y10T 137/0318* (2015.04); *Y10T 137/7768* (2015.04); *Y10T 137/8326* (2015.04)

(58) Field of Classification Search
CPC ....... Y10T 137/8326; Y10T 137/87725; Y10T 137/87217; Y10T 137/8158; Y10T 137/2589; Y10T 137/2574; Y10T 137/2622; Y10T 137/2635; F16K 37/0041; F16K 31/12

USPC .... 137/596, 596.14, 596.17, 596.18, 115.01, 137/115.07, 115.18, 115.19, 115.23, 137/487.5, 551, 557

See application file for complete search history.

(56) References Cited

U.S. PATENT DOCUMENTS

| | | | |
|---|---|---|---|
| 4,217,934 A | | 8/1980 | Peters |
| 4,257,455 A | * | 3/1981 | Cameron .............. B30B 15/142 |
| | | | 137/596.16 |
| 4,274,438 A | * | 6/1981 | La Coste ................ F01D 21/20 |
| | | | 137/551 |
| 4,643,228 A | | 2/1987 | Spencer |
| 4,706,932 A | | 11/1987 | Yoshida et al. |
| 4,911,192 A | * | 3/1990 | Hartfiel .............. G05D 16/2093 |
| | | | 137/14 |
| 5,161,376 A | | 11/1992 | Hartmann |
| 5,348,036 A | | 9/1994 | Oksanen et al. |
| 5,350,152 A | * | 9/1994 | Hutchison ............. F15B 13/043 |
| | | | 137/625.64 |
| 5,366,202 A | * | 11/1994 | Lunzman ............ F15B 13/0402 |
| | | | 137/625.64 |
| 5,377,488 A | | 1/1995 | Malina |
| 6,736,703 B2 | * | 5/2004 | Osada .................. B23D 47/045 |
| | | | 125/16.01 |
| 7,621,211 B2 | | 11/2009 | Ma et al. |
| 2010/0152907 A1 | | 6/2010 | Meier et al. |
| 2010/0179697 A1 | | 7/2010 | Stelter et al. |

* cited by examiner

HYDRAULIC SYSTEM WITH A DYNAMIC SEAL

RELATED APPLICATIONS

This application claims the benefit of priority from U.S. Provisional Application No. 61/695,349 by Matthew J. Beschorner et al., filed Aug. 31, 2012; and is a continuation-in-part of application Ser. No. 13/832,085, filed Mar. 15, 2013, by Matthew J. Beschorner et al., which claims the benefit of priority from U.S. Provisional Application No. 61/677,744, filed Jul. 31, 2012, the contents of each which are expressly incorporated herein by reference.

TECHNICAL FIELD

The present disclosure relates generally to a hydraulic system, such as for a work machine, and in particular, to a hydraulic system having a dynamic seal used in a valve device.

BACKGROUND

Control valves have many different applications, such as controlling pressure downstream from the valve, controlling levels in tanks or reservoirs either upstream or downstream from the valve, reducing undesirable effects of pressure surges in supplies due to actuating related valves or pumps, etc. The valves have a valve element that is modulated to throttle flow through the valve to attain a desired pressure drop or flow condition across the valve. A fluid-filled, variable volume control chamber is sealed with a movable partition means, for example a piston with a dynamic seal or sliding resilient seal, such as e.g., a flat or rolling flexible diaphragm. The dynamic seal isolates the control chamber having low pressure from the main flow chamber usually having higher working pressures. The piston and dynamic seal are movable within the valve body in response to pressure changes within the control chamber. A pilot pressure system is coupled to the control chamber. The pilot system generates at least one type of pressure signal which is processed following conventional techniques and generates a control signal which is fed into the control chamber used to control position of the main valve member. However, the dynamic seal is subject to wear and potential failure due to substantial movement, manufacturing defects, and/or aging.

U.S. Pat. No. 5,348,036 to Oksanen describes an automatic control valve having a main valve member movable between open and closed positions in response to pressure applied to a first piston or diaphragm in a first control chamber to modulate flow through the valve to maintain desired flow conditions. Pilot pressure signals are generated to reflect the flow conditions, usually upstream and downstream from the valve and processed to generate a control signal fed to the first control chamber to control pressure therein. Wear of the valve causes leakage of the diaphragm or seal of the piston causing loss of primary control of the valve member which tends to fail open. An initial rise in flow through the valve is initially caused which is detected by the pilot pressure signal but because of the leakage, is unable to correct. When pilot pressure signals reflect primary control failure, a back-up piston or diaphragm moves to an active position and selectively cooperates with the main valve member to control flow conditions through the valve independently of the first control chamber, without regard to pressure control.

SUMMARY

In one example, a system can have at least one valve device that includes a valve body and a valve element slidably disposed within a passageway formed in the valve body. A first segment of the valve element and the valve body can be arranged to define a working chamber that receives a working fluid at a first pressure. The valve body and the valve element can be arranged to define a control chamber to receive a control fluid at a second pressure. An annular seal element can be disposed about a land of the valve element. The seal element and the land can be together arranged to separate the working chamber and the control chamber and to move with axial movement of the valve element. A pressure monitoring system coupled to the control chamber.

In one example, at least one valve device includes a valve body and a valve element slidably disposed within a passageway formed in the valve body. A first segment of the valve element and the valve body are arranged to define a working chamber to receive fluid at a first pressure. The valve body and the valve element are arranged to define a control chamber to receive fluid at a second pressure. The valve element has a first land and a second land axially spaced from one another. A check stem is disposed about a portion of the first land of the valve element. The check stem has an enlarged portion extending radially beyond the second land into the working chamber to selectively interface with a portion of a body inner surface of the valve body. A sleeve is disposed about a portion of the second land of the valve element. The sleeve is fixedly engaged to the body inner surface of the valve body. The outer diameter of the sleeve is greater than the outer diameter of the check stem. An annular seal element is disposed about the first land between the first land and a sleeve inner surface of the sleeve. The seal element and the first land together are arranged to separate the working chamber and the control chamber and to move with axial movement of the valve element relative to the sleeve.

In another example, the at least one valve device of the system includes a first valve device and a second valve device. Here, in this system, a pressure compensating valve is coupled to the working chamber of the first and second valve devices via a supply fluid passage. A shuttle valve is fluidly coupled to the pressure compensating valve. The valve element of the first and second valve devices further includes an axial passage formed therein and a first radial passage, a second radial passage and a third radial passage formed therein each extending radially from the axial passage. One of the radial passages of each of the first and second valve devices is fluidly coupled to shuttle valve. In one example, a method of mitigating seal wear provided with at least one valve device. The valve device includes a valve body having a passageway formed therein, and a valve element disposed within the passageway of the valve body and operable to move axially relative to the valve body. A working chamber is defined between the valve element and the valve body to receive fluid, and a control chamber is defined between the valve element and the valve body and separated from the working chamber by a land to receive fluid via a supply passage. An annular seal (or dynamic seal) is disposed about the land and configured to move with axial movement of the valve element. The method includes providing fluid at a first pressure to the working chamber, and providing fluid at a second pressure to the control chamber through the supply passage. The supply passage having a check valve and a pilot relief valve disposed between the check valve and the control chamber. The method includes relieving fluid pressure in the supply passage with the pilot relief valve to a tank at a preset pressure limit. The method can include comparing the determined pressure of the supply passage with a predetermined pressure, and communicating a warning signal to an operator when the determined pressure is at or above the predetermined pressure. The method can include relieving fluid pressure in the supply passage with a pump relief valve disposed between a pilot pump coupled to the supply passage and the check valve. The pump relief valve is movable to permit passage of fluid to a tank at a preset pressure limit less than the present pressure limit of the pilot relief valve.

Although the drawings depict exemplary embodiments or features of the present disclosure, the drawings are not necessarily to scale, and certain features may be exaggerated in order to better illustrate and explain various embodiments of the present disclosure. The exemplifications set out herein illustrate exemplary embodiments or features of the disclosure and such exemplifications are not to be construed as limiting the scope of the disclosure in any manner.

DETAILED DESCRIPTION

Reference will now be made in detail to various embodiments of the disclosure, examples of which are illustrated in the accompanying drawings. Wherever possible, the same reference numbers will be used throughout the drawings to refer to the same or like parts.

Figure 1:
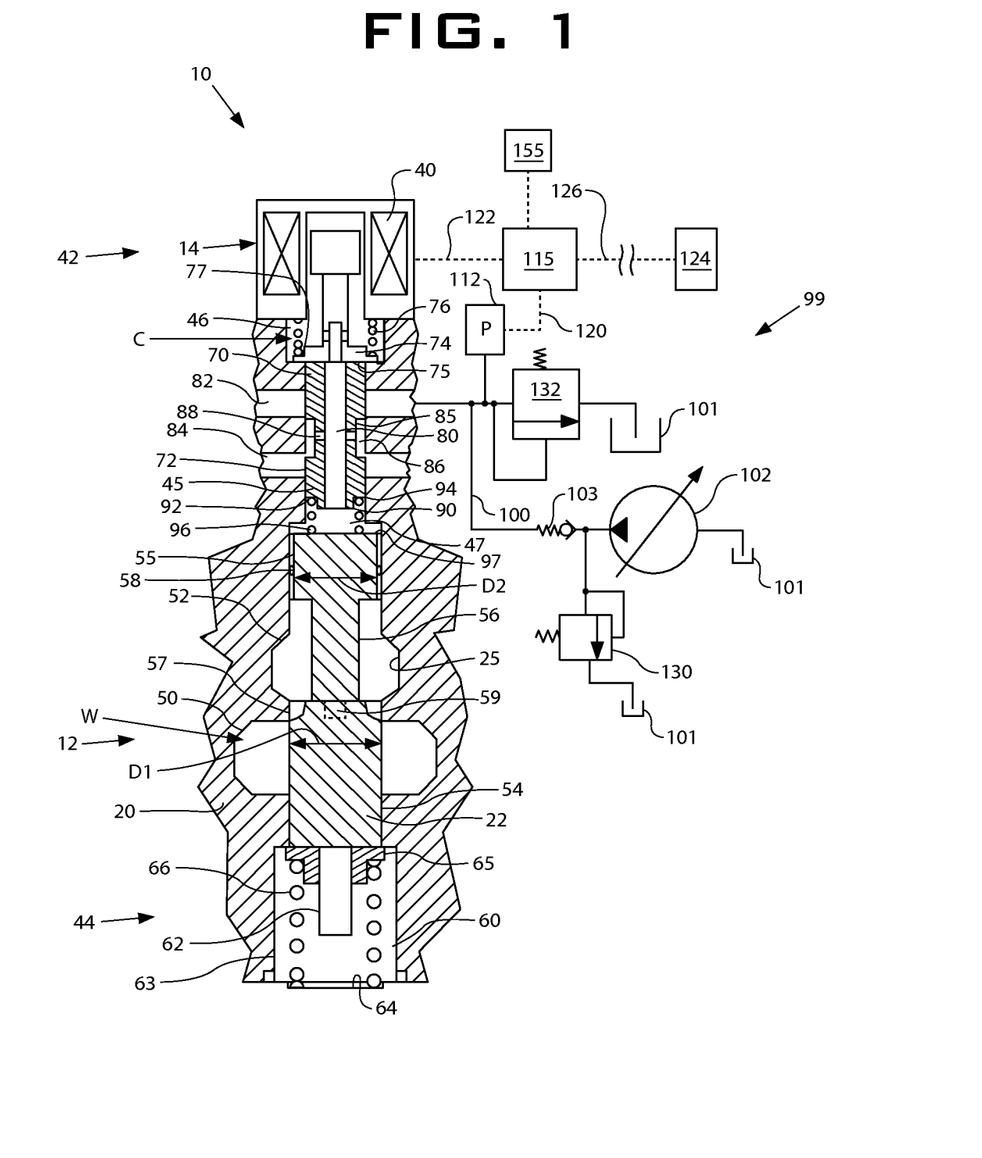
FIG. 1 is a cross-sectional view of a valve device coupled to a pressure monitoring system.

In FIG. 1, one example of a hydraulic system 10 having a valve device 12 coupled to a pilot control assembly 14. In one example, the valve device 12 may be an independently-operated, electronically-controlled metering valve. The valve device can control fluid flow between a pump, a tank, and/or a hydraulic actuator, or between any other hydraulic components. The valve device 12 can include a cylindrical hollow valve body 20 and a valve element 22 disposed within a passageway 25 of the valve body 20. The valve element 22 can be configured to separate a working chamber for passage of a working fluid having a working pressure P1 and a control chamber for passage of a control fluid having a control pressure P2. The working chamber can include one or more inlet ports (not shown) and one or more outlet ports (not shown) coupled to a hydraulic working circuit. Working fluid can enter the working chamber through an inlet port and exit the working chamber through an outlet port. The control chamber can include one or more inlet ports (not shown) and one or more outlet ports (not shown) coupled to a hydraulic pilot circuit. Control fluid can enter the control chamber through the inlet port and exit the control chamber through the outlet port. The position of the valve element 22 can be controlled such that the working fluid exiting the working chamber has a desired flow rate and/or pressure.

The valve element 22 may be capable of moving axially within the valve body 20 based on a force imbalance acting on the sides of the valve element. Once the control chamber is pressurized on the proximal side of the valve element, the spring force on the distal side is overcome, thereby causing the valve element to move, as will be described.

The pilot control assembly 14 can include a proportional electromagnetic device 40 or solenoid assembly at a proximal end 42 of the valve body 20. Throughout the description, the term "proximal" will refer to a position or a direction toward the proximal end 42 of the valve body, whereas the term "distal" will refer to a position or a direction toward a distal end 44 of the valve body 20, which lies opposite the proximal end 42.

FIG. 1 illustrates one example of an electromagnetic device, and as can be appreciated by those skilled in the art, other arrangements can be utilized to achieve similar functionality. For example, the electromagnetic device 40 may include an armature that is attached to a control spool 45. The control spool 45 may be hydraulically balanced between a pair of control chambers 46, 47 that may be formed in the valve body 20, which together generally can define the control chamber. The electromagnetic device 40 may be operable to move the control spool 45 between a first position and a second position, typically from the first position to the second position. The electromagnetic device 40 may be controlled in any manner readily apparent to one skilled in the art, such as through electrical signals generated by a controller, shown as a controller 115. For example, a computer or microprocessor may cause an electric current to be applied to the electromagnetic device 40. The application of the electric current can energize the electromagnetic device 40 and generate a magnetic field that causes the control spool 45 to move in the direction to the second position to permit control fluid to enter at least one of the control chambers 46, 47. A pilot supply, described later, can provide a pressurized control fluid selectively to at least one of the control chambers 46, 47 via the pilot control assembly. The hydraulic pilot circuit can include the pilot supply coupled to a main pump or a separate pilot pump with an associated relief valve, or any other conventional source of pressurized fluid known in the art.

The valve element 22 can comprise a spool configuration slidably disposed within the passageway 25 of the valve body 20 for controlling fluid communication between respective inlet and outlet ports. For example, the valve body 20 may include first and second annular cavities 50, 52 or more formed therein and axially spaced from one another to open into the passageway 25. The valve element 22 may include a first land 54 distally spaced from a second land 55 and a reduced-diameter portion 56 between the lands 54, 55. The annular region defined between the reduced-diameter portion 56 and a body inner surface 57. The body inner surface 57 can define the passageway 25 of the valve body 20 and may together with the reduced-diameter portion 56 define generally the working chamber W.

The first land 54 can have a first diameter D1 that is sized approximately the same as the inner diameter of the passageway 25 to allow for sliding along the body inner surface 57. The second land 55 can have a second diameter D2. The second diameter D2 may be sized slightly less than the first diameter D1. A dynamic or reciprocating annular seal 58 can be disposed between the outer circumference of the second land 55 and the body inner surface 57. In one example, the body inner surface 57 can be the surface defining the passageway 25. However, in other examples, the body inner surface 57 may be associated with an inner surface defining the opening formed in a cylindrical sleeve (see FIG. 4) or other component, rather than being associated with the valve body. The dynamic seal 58 may be partially disposed within an annular groove formed in the second land 55. The dynamic seal 58 is configured to inhibit fluid communication between pressurized fluids in the control and working chambers, while being configured to move axially with axial movement of the valve element 22. In one example, the dynamic seal 58 can take the form of an elastomeric O-ring, having a circular, rectangular, other geometric cross-sections, including irregular cross-sectional shapes, or other designs as appreciated by those skilled in the art. In another example, the dynamic seal 58 can take the form of a polytetrafluoroethylene (PTFE) ring, which may be more lubricious than an elastomeric material. The dynamic seal may include an opposing dual cup seal, where a first cup seal element is disposed in a confronting relationship with a second cup seal element, together forming a rectangular-like seal.

The first and/or second lands 54, 55 of the valve element 22 may include one or more metering slots at ends that correspond to the reduced-diameter portion 56. For example, if provided, metering slots 59 can be formed at a proximal end of the first land 54 to provide fluid communication between the annular cavities 50, 52. For instance, when the valve element 22 moves distally a sufficient distance for the metering slots 59 to open to the first annular cavity 50, the metering slots 59 are configured to provide fluid communication between the annular cavities 50, 52. When the valve element 22 moves proximally a sufficient distance, the metering slots 59 are blocked from providing fluid communication between the annular cavities 50, 52. In one example, the first land 54 may have four metering slots 59 at its proximal end, which are disposed in two diametrically-opposed pairs. The metering slots 59 may be semi-circular. However, it should be appreciated that the first and/or the second land may include more or less than four metering slots. It should further be appreciated that the metering slots may be shaped and positioned as necessary to achieve desired performance results.

A spring chamber 60 may be disposed at the distal end 44 of the valve body 20. The spring chamber 60 may be integrally formed with the valve body 20 or may be a discrete cylindrical member coupled to the valve body. The valve element 22 may also include a reduced-diameter distal portion 62 to be disposed in the spring chamber 60. An expanded-diameter passageway 63 and the distal end 44 of the valve body 20 may define the spring chamber 60. A groove 64 may be formed into the distal end of the valve body 20. The spring chamber 60 may be in communication with the tank so that any fluid leakage in the spring chamber 60 can be drained. A limiting collar 65 may be disposed on the distal portion 62 of the valve element 22 to limit the movement of the valve element 22 in a proximal direction. The spring chamber 60 can house a first spring 66, which can be disposed between a distal end of the valve element 22 and a proximal inner surface of the groove 64 of the spring chamber 60. The first spring 66 can provide a centering bias to the valve element 22 in a proximal direction.

As shown in FIG. 1, the control spool 45 may have a first land 70 proximally spaced from a second land 72. A first control limiting collar 74 may be disposed at a proximal end 75 of the first land 70 to limit the movement of the control spool 45 in the distal direction. A second spring 76 may be disposed in the proximal control chamber 46 between the electromagnetic device 40 and a spring shoulder 77 disposed on the first control limiting collar 74. The control spool 45 and the first control limiting collar 74 may include a longitudinal throughbore 80 extending the length thereof. The throughbore 80 can provide fluid communication between the proximal control chamber 46 and the distal control chamber 47.

As a result, the control spool 45 may have a pressure balance. The force of the second spring 76 can bias the control spool 45 in a direction away from the electromagnetic device 40 to close communication between a pilot supply cavity 82 and the distal control chamber 47, and to open communication between a pilot drain cavity 84 and the distal control chamber 47. The pilot supply cavity 82 and pilot drain cavity 84 can be formed in the valve body 20, axially spaced from one another. A pilot supply can provide low pressure fluid to the pilot supply cavity 82 about the control spool 45. A tank or drain can be in fluid communication with the pilot drain cavity 84 about the control spool 45, such as, e.g., via a drain passage.

The control spool 45 may include a reduced-diameter portion 85 forming an annular chamber 86 between the lands 70, 72. The reduced-diameter portion 85 may include at least one transverse throughbore 88 that opens to the annular chamber 86, for example, at diametrically-opposed sides of the reduced-diameter portion 85. Additional transverse and/or longitudinal throughbores may be provided to meet desired performance criteria. A distal end 90 of the control spool 45 may also include an annular groove 92 to form a distally-facing shoulder 94. Axial spacing between the control spool 45 and the valve element 22 can define the distal control chamber 47 within the passageway 25. A third spring 96 can be disposed in the distal control chamber 47 between the distally-facing shoulder 94 of the control spool 45 and a proximal end 97 of the valve element 22. Thus, the third spring 96 can bias the control spool 45 away from the valve element 22 and against the bias of the second spring 76.

Figure 4:
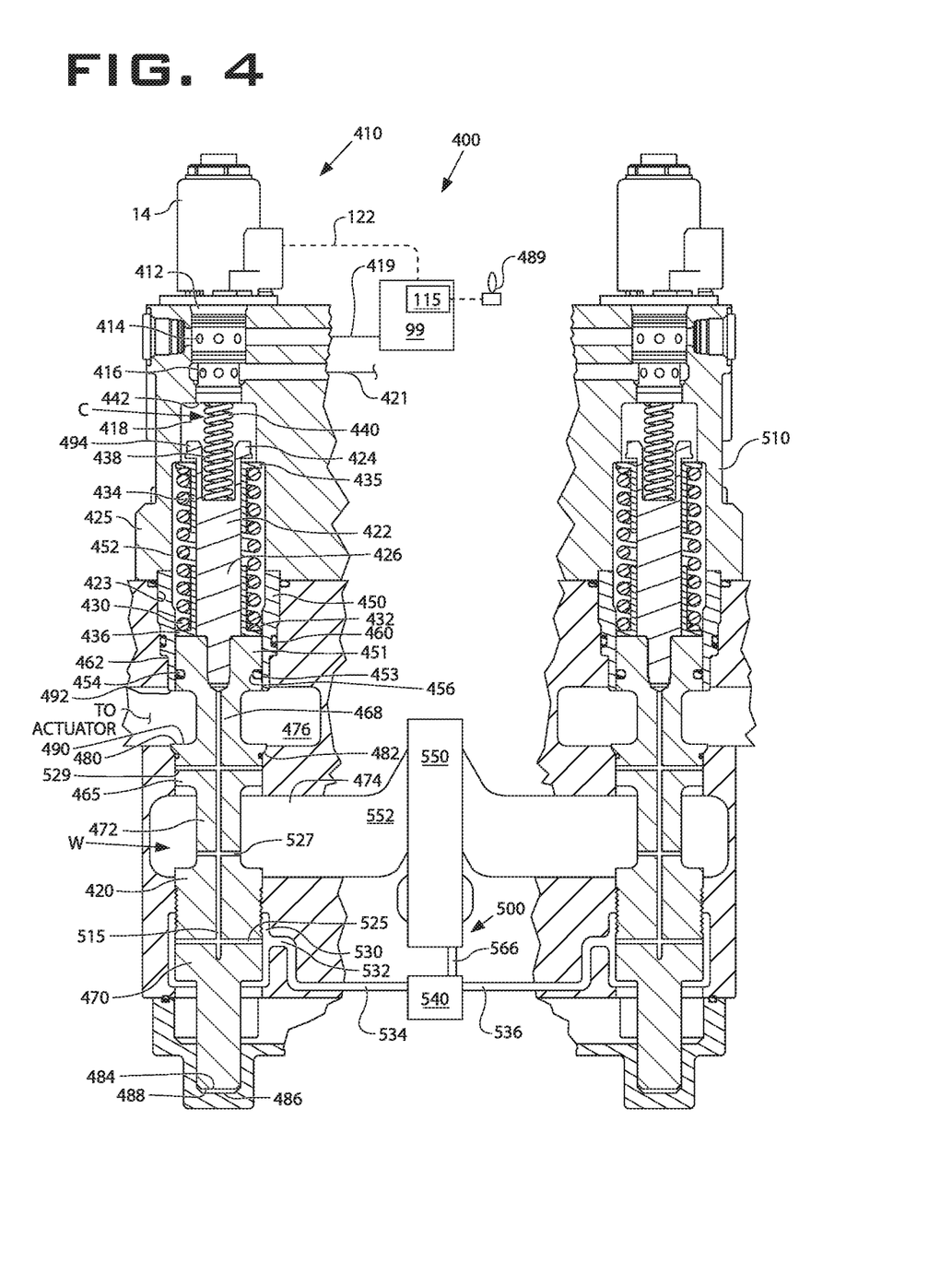
FIG. 4 is a partial cross-sectional view of another example of a valve device coupled to a pressure monitoring system.
Figure 5:
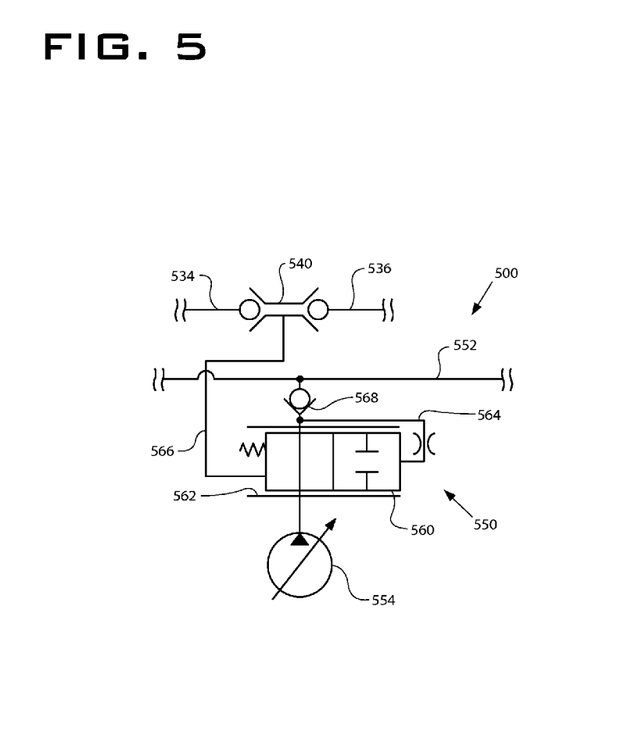
FIG. 5 is a schematic depicting an exemplary pressure compensating system coupled between valve devices.

FIG. 1 illustrates one example of a valve system. It can be appreciated by those skilled in the art that the components, such as the springs, the valve element or control spool, lands, slots, and the like, can be differently arranged to perform consistently with the system 10 described herein. For example, another type of valve system is shown in FIGS. 4-5, such as a push type valve.

In FIG. 1, the system 10 can also include a pressure-monitoring system 99 that is associated with at least one of the control chambers 46, 47 of the pilot control assembly 14. The system 99 can be operable to mitigate the risk of damage caused by wear of dynamic seal 58, typically caused by overuse, defective manufacturing, or negligent servicing. The system 99 may be used to detect failure of the dynamic seal 58 and notify the operator of its failure so that the operator can safely take precautions during machine operation.

In one example, the system 99 may include a detection system for dynamic seal wear 58. A supply conduit 100 in fluid communication with the one of the cavities, such as, for example, the pilot supply cavity 82 can be extended to a tank 101. A pilot relief device 132 may be fluidly coupled to the supply conduit 100. A pilot pump 102, such as a fixed displacement or variable displacement pump, can be associated with the supply conduit 100. Fluid supplied from the tank 101 can be pressurized by the pilot pump 102, and the pressurized fluid can be supplied to the control chamber via the pilot supply cavity 82. A load-hold check valve 103, which may have a biasing element such as a spring, may be provided downstream of the pilot pump 102.

A pressure sensor 112 can be associated with the supply conduit 100 to detect the pressure of the control fluid within the supply conduit 100, which can correspond to the control pressure P2 of the control chamber. A controller 115 may be electronically coupled to the pressure sensor 112 via a communication line 120. The same controller 115 or a different controller may be in electrical communication with the electromagnetic device 40 of the pilot control assembly 14 via a communication line 122. The pressure sensor may be housed in the end plate of the valve body where the electromagnetic device attaches to the valve body. Additional pressure sensors may be provided throughout the pilot circuit for additional pressure data. The pressure sensor may be mounted within the control chamber itself.

The controller 115 may be embodied in a single microprocessor or multiple microprocessors that include a means for controlling an operation of the pilot control assembly 14. The controller 115 may be embodied in a single microprocessor or multiple microprocessors that include a means for receiving signals from the pressure sensor indicative of control pressure of the control chamber, comparing the sensed pressure with a predetermined pressure, and if greater than the predetermined pressure, communicating a warning via an audio and/or visual indicator 124 to the operator. The audio and/or visual indicator can be provided in various forms such as a light, a speaker, a graphical operator interface. Numerous commercially available microprocessors can be configured to perform the functions of the controller. The controller may include a memory, a secondary storage device, a processor, data bus and any other components for running an application. Various other circuits may be associated with the controller such as power supply circuitry, signal conditioning circuitry, solenoid driver circuitry, and other types of circuitry.

To operate the valve device 12 to either open or close (this example describes a normally closed valve device), the operator of the machine can move an input device 155, such as, e.g., a lever or joystick, which communicates a position signal that is indicative of the position of the input device 155 to the controller 115. The controller 115 can process the position signal to determine a solenoid command signal, usually in the form of a current signal, as a function of the position of the input device 155 and/or other inputs. The controller 115 can send the solenoid command signal to the pilot control assembly 14. In response to receiving the solenoid command signal, the electromagnetic device can become energized to cause the control spool 45 to move in a desired manner.

The controller 115 may retrieve or store pressure data in a database. The controller may compare present pressure data with pressure data contained or stored within the database. The database may be pre-programmed with design data or may store historical data related to the pressure data. The database may utilize data structures, index files, or any other data storage and retrieval technique, without any limitation.

For example, the controller 115 may be configured to receive signals from the pressure sensor 112 indicative of a pressure P2 of the control chamber. When the seal becomes ineffective, e.g., from wear or defect, the pressure detected, or pressure P2, in the control chamber can rise above and/or fall below an expected pressure range of the control chamber. When outside the expected pressure range, the controller 115 can communicate via communication lines 126 a warning signal indicative of the seal failure.

In another example, the system 99 may include a mitigation system for dynamic seal wear, instead of or in addition to the detection system described herein. A pump relief valve 130 and a pilot relief valve 132 can be coupled to the supply conduit 100, disposed between the control chamber and the tank 101. For example, the pump relief valve 130 can be fluidly coupled between the check valve 103 and the pilot pump 102, and the pilot relief valve 132 can be fluidly coupled downstream of the pump relief valve 130. In one example, the check valve 103 can be fluidly coupled between the pump and pilot relief valves 130, 132.

Each of the pump relief valve 130 and the pilot relief valve 132 can have a valve element that is movable between a first closed position and a second open position. A biasing member may be associated with the valve element in order to bias the valve element in one of its positions, such as being biased in the first closed position. Each relief valve 130, 132 may be operable to maintain its position in the first closed position, until the pressure within the supply conduit 100 is greater than a threshold pressure, then each relief valve 130, 132 can be moved to its second open position. When in the second open position, the fluid within the supply conduit 100 can be drained to the tank 101. A signal conduit may be associated with each relief valve to provide an upstream signal pressure representative of the pressure within the supply conduit 100, which is indicative of a force on the end opposite the biasing member. For instance, when the pressure in the supply conduit is sufficiently high, the force indicative of the higher pressure can be greater than the biasing force provided by the biasing member to move the valve element of the relief valve to the other position, such as the second open position.

The maximum threshold pressure of each of the relief valves 130, 132 can be selected to prevent damage to the pilot system and to mitigate the risk of damage to the valve system. The pilot relief valve 132 can be set at a higher pressure limit than the pump relief valve 130. To this end, the pump relief valve will move to its open position prior to the pilot relief valve. In this instance, downstream pressure between the check valve 103 and the valve device 12, which is representative of the control chamber pressure, can increase due to a seal leakage from the high pressure side of the working chamber W. The relief valves may be housed in the end plate of the valve body where the electromagnetic device attaches to the valve body.

Figure 2:
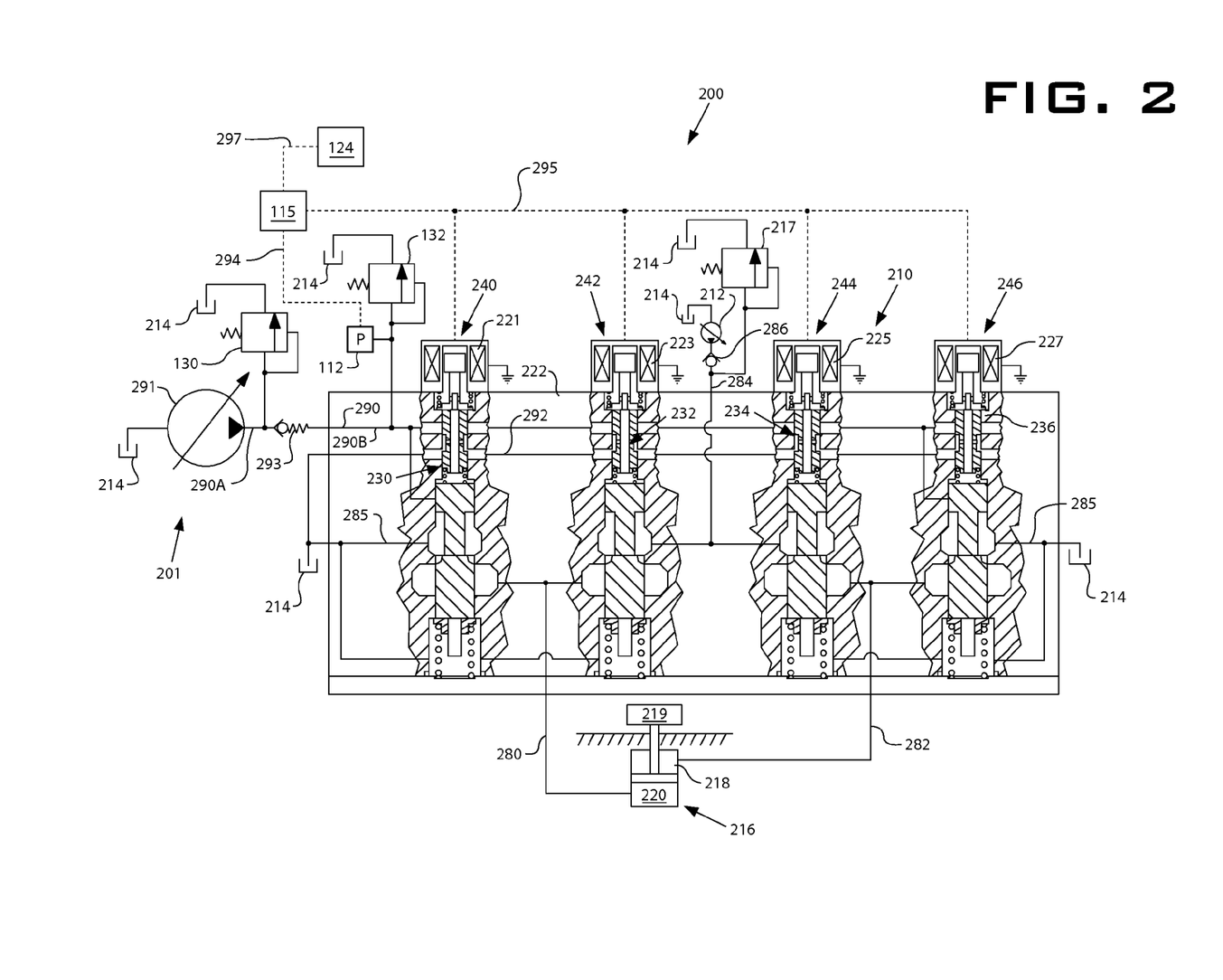
FIG. 2 is schematic depicting a hydraulic system having four valve devices coupled to a pressure monitoring system.

FIG. 2 illustrates a hydraulic system 200 with more than one valve devices associated with a pressure-monitoring system 201, for example, a centrally located system, used for detection and/or mitigation of dynamic seal wear. It can be appreciated by those skilled in the art that a pressure monitoring systems with multiple relief valves throughout the pilot circuit can be used with system 200 (see, e.g., FIG. 3). The valve devices can independently or integrally form an electrohydraulic valve assembly 210. The electrohydraulic valve assembly 210 is shown in combination with a main pump 212, a fluid reservoir such as a tank 214, and a fluid actuator 216 such as a hydraulic cylinder or motor. The main pump 212 may include, for example, a high pressure pump to supply a working fluid having a working pressure P1. A relief valve 217 can be disposed between the main pump 212 and each of the valve devices of the valve assembly 210. The relief valve 217 can be movable between a normally closed position and an open position. In response to the working fluid pressure being at or above a predetermined threshold pressure, the relief valve 217 can be moved to the open position to permit the passage of fluid to the tank 214.

In one example, the actuator 216 can be a hydraulic cylinder having a rod end chamber 218, a head end chamber 220, and an output member 219. In one example, the valve assembly 210 may include a single valve body 222 having a plurality of passageways 230, 232, 234, 236. The diameter of each passageway may vary along its length. The valve assembly 210 also may include a plurality of independently-operated, electronically-controlled valve devices 240, 242, 244, 246 individually seated in the passageways 230, 232, 234, 236, respectively. Although four valve devices are shown, the system 200 may include two, three, five, or more valve devices.

Each of the valve devices 240, 242, 244, 246 may be configured similarly to the valve device 12 shown in FIG. 1. The valve devices 240, 242, 244, 246 can include a proportional electromagnetic device 221, 223, 225, 227, respectively, at an end of the valve body 222. In one application, the plurality of valve devices 240, 242, 244, 246 can be configured to control fluid flow between the main pump 212, the tank 214, and the actuator 216. For example, the valve devices may be referred to individually as a cylinder-to-tank head end (CTHE) metering valve device 240, a pump-to-cylinder head end (PCHE) metering valve device 242, a pump-to-cylinder rod end (PCRE) metering valve device 244, and a cylinder-to-tank rod end (CTRE) metering valve device 246.

A head end cylinder conduit 280 can provide fluid communication between the first annular cavity 50 of the corresponding PCHE and CTHE valve devices 240, 242 and the head end chamber 220 of the actuator 216. A rod end cylinder conduit 282 can connect the first annular cavity 50 of the corresponding PCRE and CTRE valve devices 244, 246 with rod end chamber 218 of the actuator 216. An inlet conduit 284 can provide communication between the main pump 212 and the second annular cavity 52 of the corresponding PCHE and PCRE valve devices 242, 244 and may contain a load-hold check valve 286. A tank conduit 285, for example, can provide communication between the tank 214 and the second annular cavity 52 of the corresponding CTHE, CTRE valve devices 240, 246.

A pilot supply 290 can provide a low pressure fluid to the pilot supply cavity 82 of the corresponding valve devices 240, 242, 244, 246. The pilot supply 290 may include the main pump with an associated pressure reducing valve, a separate pilot pump with an associated relief valve, or any other conventional source of pressurized fluid known in the art. FIG. 2 shows a separate pilot pump 291 with a load-hold check valve 293. The pilot supply cavity 82 of the corresponding valve devices 240, 242, 244, 246 can be in fluid communication with the tank 214 via the pilot supply 290 and the pilot drain cavity 84 can be in fluid communication via a common drain passage 292.

The system 201 can include the pressure sensor 112 coupled to the pilot supply 290 that extends to the tank 214. The pilot supply 290 can couple to at least one of the control chambers of each of the valve devices 240, 242, 244, 246. The pressure sensor 112 can be associated with the pilot supply 290 to detect the pressure of the control fluid within the pilot supply 290, which can correspond to the highest control pressure P2 of the control chamber of the valve devices 240, 242, 244, 246. The controller 115 may be electronically coupled to the pressure sensor 112 via a communication line 294, and may also be electronically coupled to the electromagnetic devices 221, 223, 225, 227 of the valve devices 240, 242, 244, 246 via a communication line 295. The controller 115 may communicate a warning via an audio and/or visual indicator 124 to the operator via a communication line 297.

The pump relief valve 130 and the pilot relief valve 132 can be coupled to the pilot supply 290, disposed between the control chamber and the tank 214. Each relief valve 130, 132 can have a valve element that is movable between a first closed position and a second open position. Each relief valve 130, 132 may be operable to maintain its position in the first closed position, until the pressure within the corresponding segments 290A, 290B of the pilot supply 290 is greater than a predetermined threshold pressure limit preset with each relief valve, then each relief valve is moved to its second open position. When in the second open position, the fluid within the corresponding segment of the pilot supply 290 can be drained to the tank 214. The predetermined threshold pressure of the pump relief valve 130 can be set to be less than the predetermined threshold pressure of the pilot relief valve 132. The pilot relief valve 132 can be set higher to allow the pressure sensor 112 to measure anomaly pressures variations between the first threshold pressure of the pump relief valve 130 and the second threshold pressure of the pilot relief valve 132 in pilot supply.

The maximum threshold pressure of each of the relief valves 130, 132 can be selected to prevent damage to the pilot system to mitigate the risk of damage to the valve system. The pilot relief valve 132 can be set at a higher pressure limit than the pump relief valve 130. To this end, the pump relief valve will move to its open position prior to the pilot relief valve. In this instance, downstream pressure between the check valve 293 and one or more of the valve devices 240, 242, 244, 246 of the pilot supply segment 290B can increase during a seal leakage from the high pressure side of the working chamber W. Here, since the valve devices 240, 242, 244, 246 can be fluidly coupled to a common pilot supply segment 290B, whichever one of the control chamber of the valve devices 240, 242, 244, 246 has the highest pressure will set the pressure of the pilot supply segment 290B.

Figure 3:
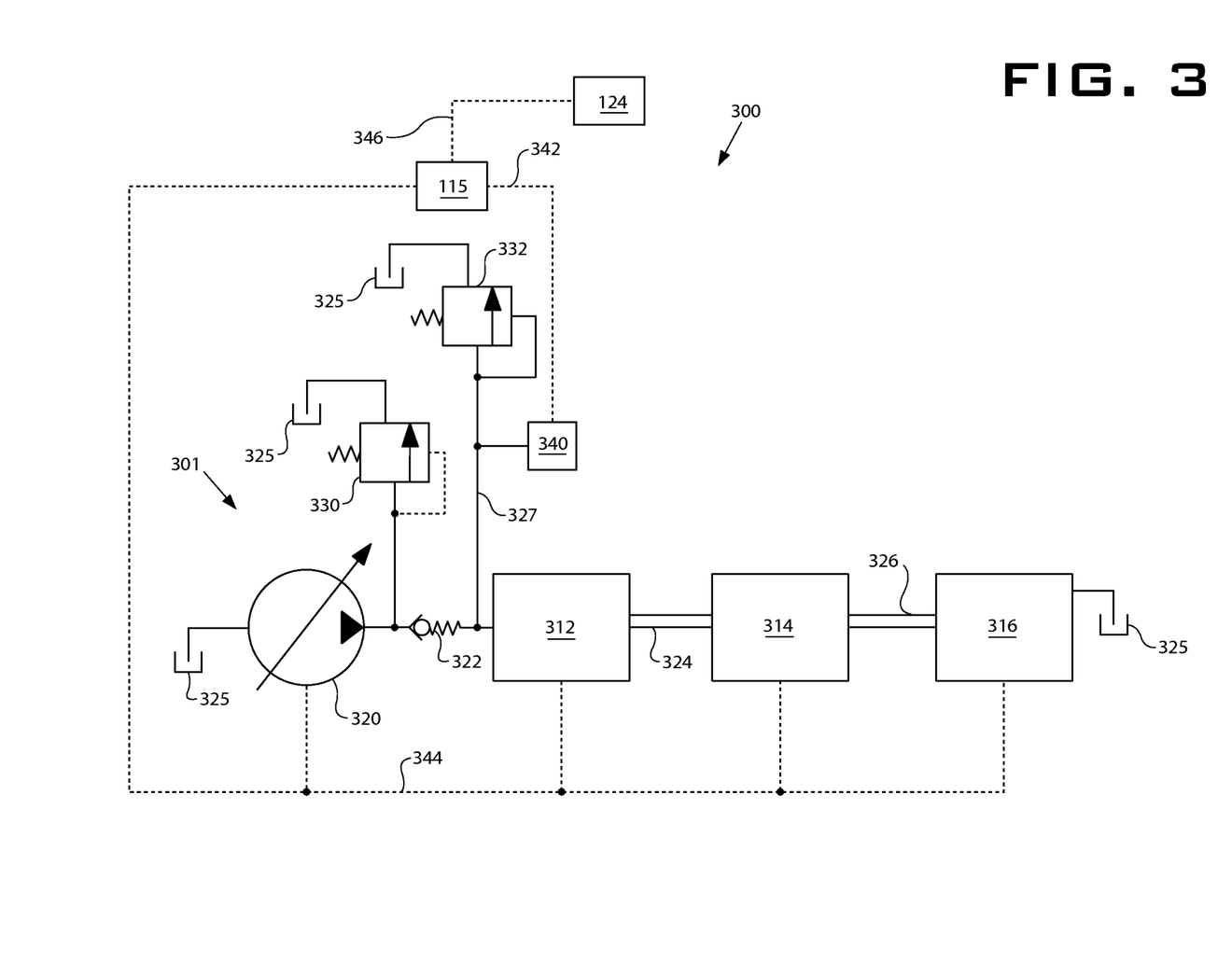
FIG. 3 is schematic depicting a hydraulic system having three valve arrangements coupled to a pressure monitoring system.

FIG. 3 illustrates a hydraulic system 300 with more than one valve arrangement associated with a pressure-monitoring system 301 used for detection and/or mitigation of dynamic seal wear. Although three valve arrangements 312, 314, 316 are shown, it can be appreciated by those skilled in the art that two or four or more valve arrangements can be provided. Each valve arrangement 312, 314, 316 can include the single valve device shown in FIG. 1, the multiple valve arrangement shown in FIG. 2, or any combination thereof, used to influence the movement of fluid actuators (not shown). In one example, the valve arrangement may be in close proximity with its corresponding fluid actuator. To this end, the pressuring-monitoring system 301 may include components that are disposed in close proximity with its corresponding actuator in a similar manner. Further, multiple pressure sensors and relief valves can be distributed throughout the system for enhanced local pressure monitoring.

The system 300 may include a pilot pump 320 with a load-hold check valve 322 to supply pressurized fluid via a pilot supply 324 fluidly coupled between each of the valve arrangements 312, 314, 316. A common drain passage 326 may also fluidly coupled between each of the valve arrangements 312, 314, 316 and to a tank 325. Separate drain passages to tank 325 may be utilized for each valve arrangement.

A pump relief valve 330 and a pilot relief valve 332 can be coupled to a portion of the pilot supply 324. The pilot relief valve coupled to the pilot supply 324 via a supply conduit 327. The relief valves 330, 332 can have a valve element that is movable between a first closed position and a second open position. Each relief valve 330, 332 may be operable to maintain its position in the first closed position, until the pressure within the pilot supply 324 is greater than a predetermined threshold pressure limit preset with each relief valve, then each relief valve is moved to its second open position. When in the second open position, the fluid within the pilot supply can be drained to the tank 325. The predetermined threshold pressure of the pump relief valve 330 can be set to be less than the predetermined threshold pressure of the pilot relief valve 332. A pressure sensor 340 can be coupled between the pilot supply 324 and the pilot relief valve 332. The controller 115 may be electronically coupled to the pressure sensor 340 via a communication line 342, and may also be electronically coupled to the electromagnetic devices of the valve arrangements 312, 314, 316 and/or pump 320 via a communication line 344. The controller 115 may communicate a warning via an audio and/or visual indicator 124 to the operator via a communication line 346.

The maximum threshold pressure of the relief valves 330, 332 can be selected to prevent damage to the pilot system and to mitigate the risk of damage to the valve system. The pilot relief valve 332 can be set at a higher pressure limit than the pump relief valve 330. To this end, the pump relief valve will move to its open position prior to the pilot relief valve. In this instance, downstream pressure of the pilot supply 324 can increase during a seal leakage from the high pressure side of the working chamber W. Here, since the valve arrangements 312, 314, 316 can be in close proximity to the actuator and separated from one another, whichever one of the valve arrangements 312, 314, 316 has the highest pressure may individually trip the relief valve without affecting the other valve arrangements.

In another example, the valve arrangements 312, 314, 316 do not share a common pilot supply 324 and drain passage 326. In this instance, separate pilot supplies are extended from the pump discharge of the pump 320 to corresponding valve arrangements, with the separate pilot supplies have a check valve. Each pilot supply can also have its own pressure-monitoring system arrangement (not shown) including, such as, for example, the supply conduit 327 extending from each separate pilot supply, the pressure sensor 340 coupled to the supply conduit 327, and the relief valve 332 coupled to the supply conduit 327.

FIG. 4 illustrates another example of a valve device 410 that is coupled to the pilot control assembly 14 to form a hydraulic system 400. The valve device 410 is similar to the valve device 12, and similar reference numerals and nomenclature will be used when describing similar components. The control spool assembly 412, includes the longitudinal throughbore (not shown) and proximal and distal transverse throughbores 414, 416 (or meter-in and meter-out orifices) in communication the longitudinal throughbores. The longitudinal throughbore can extend to the proximal control chamber 418. Axial movement of the control spool assembly 412 can selectively communicate the transverse throughbores 414, 416 with the pilot supply 419 and the drain passage 421.

The valve element 420 may include a retainer 422. The retainer 422 may be a discrete piece that may be fixedly attached to the proximal end of the valve element 420. The retainer 422 can include an enlarged proximal head 424 extending from a retainer body 426. The retainer can be disposed proximal to the lands of the valve element. The first spring 430 can be positioned around the retainer body 426. The first spring 430 can be the primary centering spring that applies a biasing force to the valve element 420. To this end, when the electromagnetic device of the pilot control assembly 14 is not energized, the first spring 430 can bias the valve element 420 to its steady state position, such as, e.g., normally closed as shown in FIG. 4.

A proximal spring sleeve 434 and a distal spring sleeve 436 may be disposed around respective proximal and distal portions of the retainer body 426 along the inner surface of the first spring 430. The proximal and distal spring sleeves 434, 436 may include radial extensions extending from the body of the respective spring sleeves configured to capture the ends of the first spring 430. The proximal facing end of the radial extension of the proximal spring sleeve 434 can engage the body inner surface of the passageway 423 of valve body 425 at an inner flange 435. As shown in FIG. 4, a proximal end 432 of the first spring 450 is engaging the proximal facing end of the radial extension of the distal spring leave 436. The distal facing end of the radial extension of the distal spring sleeve 436 can engage the valve element portion distal to the location of the retainer. The spring sleeves 434, 436 are separated by a distance as shown in FIG. 4 to permit movement of the valve element during expansion and compression of the first spring 430. A spring opening 438 may be extended through the retainer body 426 and the enlarged proximal head 424. The third spring 440 can be sized to fit within the spring opening 438 and extend proximally to a distal end surface 442 of the control spool assembly 412. The third spring 440 can counteract axial flow forces during movement of the valve element. The third spring may be configured as a feedback spring to apply a feedback force to the control spool assembly. The retainer 422 can be configured to retain the first spring 430 and at least a portion of the third spring 440.

A sleeve 450 can be disposed about the proximal end of the valve element 420 at the second land 451 of the valve element 420, and along the inner wall of the passageway 423 of the valve body 425. The sleeve 450 may extend proximally about the distal end of the retainer 422 to define an annular space 452 therebetween to capture the distal end of the first spring 430. The sleeve 450 can be configured to remain relatively stationary with respect to the retainer 422 and the valve body in order to enhance the seal effectiveness. To this end, the sleeve 450 may have a flange at its proximal end to inhibit relative movement in the distal direction. To inhibit relative movement in the proximal direction, a cutout or groove can be formed in the valve housing where a portion of the sleeve or the second seal can interface.

The dynamic seal 454 can be disposed circumferentially around the second land 451, between the outer surface of the second land and the sleeve inner surface 453 of the sleeve 450. Here, the valve element 420 can include a seal groove 456 for receiving the dynamic seal 454. The dynamic seal is capable of moving relative to the sleeve inner surface 453 of the sleeve 450 with axial movement of the valve element. A second seal 460, such as an O-ring, can be disposed circumferentially around the sleeve 450, between the outer surface of the sleeve 450 and the body inner surface of the passageway 423 of valve body 425. Here, the sleeve 450 can include a seal groove 462 for receiving the second seal 460. The second seal 460 can be configured to inhibit leakage between the working chamber W and the proximal control chamber.

The valve element 420 can include the second land 451 and the first land 465, distal to the second land 451, bounding the first reduced-diameter portion 468. A third land 470, distal to the first land 465, can bound a second reduced-diameter portion 472. The size of the first and second reduced-diameter portions 468, 472 relative to the body inner surface of the valve body passageway 423 at the first annular cavity 474 and the second annular cavity 476, respectively, together can define the working chamber W in selective communication with pump pressure or to tank and the actuator, depending on the kind of valve device, as described above. In one example, axial movement of the valve element 420 can cause communication between the first annular cavity 474 fluidly coupled to pump and the second annular cavity 476 fluidly coupled to the actuator. Similarly, in one example, axial movement of the valve element 420 can cause communication between the first annular cavity fluidly coupled to the actuator and the second annular cavity fluidly coupled to tank.

The valve device 410 may also include a check stem 480. The check stem 480 may be formed along the proximal end of the first land 465. The check stem 480 may be an enlarged portion extending radially beyond the first land 465 and/or the second land 451 in order to facilitate selective interference fit between the check stem 480 and the body inner surface of the valve body 425. For example, in the closed position, the check stem 480 can engage a seat 482 formed in the body inner surface of the valve body 425. When engaged with the seat 482, the check stem 480 can provide a mechanical seal between the actuator and the working supply and drain, depending on the valve use. In one example, the interfacing surfaces of the check stem 480 and the seat 482 are conically shaped, and further may be conically shaped at different angles for enhanced sealing. Further, the interfacing surfaces of the check stem 480 and the seat 482 may include a radial edge. To this end, the interfacing surface of the check stem 480 can be larger than the corresponding interfacing surface of the seat 482. In another example, the interfacing surface of the check stem 480 can be a chamfered surface and the interfacing surface of the seat 482 can include a radial surface. As will be explained, the check stem 480 may also provide physical stops to inhibit movement of the valve element 420 in either direction.

The sleeve 450 can aid in the reduction of leakage between the proximal control chamber and the working chamber W. Since the second land 451 can be sized smaller than the check stem, the sleeve 450 can increase the effective diameter of the valve element 420 at the second land to further inhibit leakage. To this end, the sleeve 450 can have a portion that is flared further outward beyond the outer diameter of the check stem 480. To facilitate installation and/or servicing of the valve element 420 configured with the check stem 480, the sleeve 450 may be removable.

The distal end 484 of the valve element 420 can be spaced from the proximally facing end surface 486 of the valve body to define the distal control chamber 488. A hydraulic line (not shown), the same line or separate lines, can communicate the pressure from the pilot supply 419 to each of the proximal control chamber 418 and the distal control chamber 488. At zero energy state, a force balance is created with the force of the combination of the pressurized proximal control chamber 418, the first spring 430, and the third spring 440 in the distal direction, and the force of the pressurized distal control chamber 488 in the opposite, proximal direction. As will be explained, the pressure of the proximal control chamber 418 can be reduced to be relatively less than the distal control chamber 488 with movement of the control spool assembly 412, thereby creating a force imbalance sized to allow movement of the valve element 420 in the proximal direction away from its normally closed position to the open position. It is appreciated that the valve device 410 can be a normally open device and current applied to the electromagnetic device of the pilot control assembly 14 can move the valve element 420 toward the closed position.

To operate the valve device 410 to either open or close (this example describes a normally closed valve device), the operator of the machine can move the input device 489, such as, e.g., a lever or joystick, which communicates a position signal that is indicative of the position of the input device 489 to the controller 115. The controller 115 can process the position signal to determine a solenoid command signal, usually in the form of a current signal, as a function of the position of the input device 489 and/or other inputs. The controller 115 can send the solenoid command signal to the electromagnetic device of the pilot control assembly 14. In response to receiving the solenoid command signal, the electromagnetic device can become energized to cause the control spool assembly 412 to move distally to a different position. The control spool assembly 412 can move relative to the pilot supply 419 and drain passage 421, thereby allowing communication between at least a portion of the drain and the proximal control chamber 418, 488 via the proximal throughbores 414 and/or distal throughbores 416 and the longitudinal throughbore. This can effectively reduce the pressure in the proximal control chamber 418 to a lesser pressure relative to the distal control chamber 488 to cause a force imbalance of the valve element 420. As a result, the valve element 420 can be urged in the proximal direction to compress the third spring 440. The third spring 440 can in turn apply a proximal force to the control spool assembly 412 to balance the pressure. The first spring 430 can be also compressed to counter the pressure difference between the proximal control chamber 418 and the distal control chamber 488. In other words, force due to the pressurized proximal control chamber 418 can be reduced; however, the force balance of the valve element 420 can be equalized by the increased force due to the compression of the first spring 430 that can maintain the new position of the valve element 420. Moreover, the third spring 440 can provide direct force feedback between to the control spool assembly 412. Movement of the valve element 420 can provide at least a portion of the pump pressure to the working chamber W in order to increase fluid flow of the pressurized fluid to the actuator.

To open the valve element 420 more for additional flow to the actuator, the control spool assembly 412 can be moved (as a result of an increased position of the input device) to permit the proximal control chamber 418 to access more of the drain passage 421, thereby reducing the pressure within the proximal control chamber 418 even more. As a result, a greater pressure difference is created between the proximal and distal control chambers 418, 488 to allow the valve element 420 to move more in the proximal direction generally proportional to the degree of pressure change. The control spool assembly 412 can continue to move to a final position to permit the proximal control chamber 418 to access fully the drain passage 421, which can fully vent the proximal control chamber 418. At this condition, the force of the first spring 430 is insufficient to overcome the degree of pressure difference between the proximal control chamber 418 and the distal control chamber 488. As a result, the valve element 420 is allowed to move to its most proximal position. As a safety measure, physical stops can be employed to limit the total movement of the valve element 420. In one example, a first physical stop can be defined at the most proximal position when the proximal end 490 of the check stem 480 engages the distal end region 492 of the sleeve 450. Moreover, a second physical stop can be defined at the most distal position when the distal face of the enlarged portion of the check stem 480 engages the seat 482 formed in the valve body passageway 423. Other physical stops may be employed such as with the proximal end 494 of the retainer 422 engaging the distal end surface 442 of the control spool assembly 412.

Closing the valve element 420 can involve the operator of the machine moving the input device 489 closer to its neutral position. In response to receiving the solenoid command signal, the electromagnetic device of the pilot control assembly 14 can become less energized to cause the control spool assembly 412 to move proximally to a different position. This can effectively increase the pressure in the proximal control chamber 418 to a greater pressure relative to the distal control chamber 488 to cause a force imbalance of the valve element 420. As a result, the valve element 420 can be urged in the distal direction with the aid of the first spring 430. Force due to the pressurized proximal control chamber 418 can be increased; however, the force balance of the valve element 420 can be equalized by the reduced force due to the expansion of the first spring 430 to maintain the new position of the valve element 420. Movement of the valve element 420 toward the closed position can provide at least a portion of the pump pressure to the working chamber W in order to reduce fluid flow of pressurized fluid to the actuator.

In FIG. 4, a pressure compensating system 500 may be included between the valve device 410 and a similarly configured valve device 510. The valve device 510 can be a mirror image of the valve device 410, and thus the description of valve device 510 will be omitted.

When the pressure compensating system 500 is associated with the valve devices 410, 510, each valve device may include an axial passage 515 formed within the valve element. The axial passage 515 can extend from proximate the check stem 480 to a distal region of the valve element 420. A plurality of radial passages, such as first, second, third radial passages 525, 527, 529 can extend from the axial passage 515 to outside the valve element 420 through its outer surface. The axial and radial passages 515, 525, 527, 529 can facilitate communication of the fluid pressure therein to the pressure compensating system 500. The first radial passage 525 can be formed in the third land 470 of the valve element 420 and is configured for constant communication with a shuttle chamber 530 during movement of the valve element. The second radial passage 527 can be formed at the second reduced-diameter portion 472 of the valve element 420, in a more proximal location than the first radial passage 525. The second radial passage 527 can be configured for constant communication with the working chamber W. The third radial passage 529 can be formed in the first land 465 of the valve element, in a more proximal location than the second radial passage 527, and is configured for selective communication with the second annular cavity 476.

The shuttle chamber 530 can be an enlarged cavity formed in the valve body that is in communication with a shuttle valve 540. The second radial passage 527 can have a smaller cross-sectional area than the first radial passage 525 in order to create a different pressure drop across the passages. In other words, there can be a greater pressure drop across the second radial passage 527 than the first radial passage 525. Moreover, since the second radial passage 527 can be formed at the reduced diameter portion of the valve element, the length of the second radial passage 527 can be shorter than the first radial passage 525.

In the closed position, as shown in FIG. 4, the second radial passage 527 can communicate the pump pressure to the axial passage 515 and to the first radial passage 525. The third radial passable 529 is blocked from such communication. An internal bore 532 can extend within the valve body from the shuttle chamber 530 to an internal shuttle passage 534 that extends to the shuttle valve 540. When the valve element 420 begins to the move in the proximal direction, the third radial passage 529 can be moved to a position such that the third radial passage 529 is in communication with the pump pressure. Since the pressure drop across the third radial passage 529 is smaller than the pressure drop across the second radial passage 527, also in communication with pump pressure, the effective pressure within the axial passage 515 will be the pressure from the third radial passage 529 which can override the pressure through the second radial passage 527. This effective pressure is communicated to the shuttle valve via the first radial passage 525, the shuttle chamber 530, the internal bore 532, and the shuttle passage 534. Similarly, the effective pressure of the valve device 510 is communicated to the shuttle valve via its first radial passage, the shuttle chamber, the internal bore, and the shuttle passage 536.

With two valve devices 410, 510 communicating their respective pressures to the shuttle valve 540. The shuttle valve 540 is configured to fluidly connect the lower of the two effective pressures of the respective valve devices 410, 510 to a pressure compensating valve 550, such as, e.g., a proportional pressure compensating valve, in response to a higher pressure from either of the respective valve devices 410, 510. FIG. 5 illustrates a schematic of example pressure compensating system 500. The shuttle valve 540 may include a shuttle valve element (not shown) supported within a bore (not shown) formed in the shuttle valve body. The shuttle valve bore may be connected to the shuttle passages 534, 536. The shuttle valve 540 is configured to resolve pressure signals from the respective valve devices 410, 510 and to allow the lower outlet pressure of the two valves to affect movement of the pressure compensating valve 550.

The pressure compensating valve 550 may be a hydromechanically actuated proportional control valve disposed between a supply fluid passageway 552 and the source or pump 554, and may be configured to control a pressure of the fluid supplied to the supply fluid passageway 552. Specifically, the pressure compensating valve 550 may include a pressure compensating valve element 560 supported within a pressure compensating bore 562. The pressure compensating valve element 560 may be connected to the supply fluid passageway 552. The valve element 560 may be hydraulically biased toward a flow passing position (as shown) and movable by hydraulic pressure toward a flow blocking position. The pressure compensating valve 550 may be movable toward the flow blocking position by a fluid directed via a second fluid passageway 564 from a point between the pressure compensating valve 550 and a check valve 568. The second fluid passageway 564 may connect the pressure compensating bore 562 and the supply conduit passageway 552.

The pressure compensating valve 550 may be movable toward the flow passing position by a fluid directed via a third fluid passageway 566 from the shuttle valve 540. The third fluid passageway 566 may connect the bore of the shuttle valve 540 and the pressure compensating bore 562. It is contemplated that the pressure compensating valve element 560 may alternatively be spring biased toward a flow blocking position, that the fluid from the third fluid passageway 566 may alternately bias the valve element of the pressure compensating valve 550 toward the flow passing position, and/or that the fluid from the second fluid passageway 564 may alternatively move the valve element of the pressure compensating valve 550 toward the flow blocking position. It is also contemplated that the pressure compensating valve may alternatively be located downstream of the valve devices 410, 510 or in any other suitable location.

As one of the valve devices 410, 510 is moved to the flow passing position, pressure within the shuttle passage 534 may be lower than the pressure of the fluid within the shuttle passage 536. As a result, the shuttle valve 540 may be biased by the higher pressure, thereby communicating the lower pressure from the valve device 410 to the pressure compensating valve 550 via the third fluid passageway 566. This lower pressure communicated to the pressure compensating valve 550 may then act together with the force of the pressure compensating valve spring against the pressure from the second fluid passageway 564. The resultant force may then either move the valve element of the pressure compensating valve 550 toward the flow blocking or flow passing positions. As the pressure from the source 554 drops, the pressure compensating valve 550 may move toward the flow passing position and thereby maintain the pressure within the supply fluid passageway 552. Similarly, as the pressure from the source 554 increases, the pressure compensating valve 550 may move toward the flow blocking position to thereby maintain the pressure within the supply fluid passageway 552. In this manner, the pressure compensating valve 550 may regulate the fluid pressure to the valve devices 410, 510, generally to maintain a desired fluid flow to the valve devices.

The valve devices 410 and/or 510 may be associated with the pressure-monitoring system 99, 201, 301 described above and shown in FIGS. 1-3. In other words, the hydraulic systems 10, 200, 300 may include the valve device 410 (with or without the pressure compensating system 500) instead of the valve device 12 (as shown). Likewise, the valve device 12, 240, 242, 244, 246 or valve arrangement 312, 314, 316 may be associated with the pressure compensating system 500. In other words, the hydraulic systems 10, 200, 300 may include the pressure compensating system 500.

INDUSTRIAL APPLICABILITY

The systems and methods described herein can be used to mitigate and/or detect wear for a dynamic seal associated with a movable valve or piston of a valve device or valve arrangement. The valve device can be any type of valve that uses a pilot pressure and a dynamic seal, such as, e.g., a hydraulic actuator, on/off pilot solenoid, a pressure reducing valve, large or small displacement actuator, etc.

In use, the valve device can facilitate control of fluid flow, such as, e.g., cylinder-to-tank fluid flow or pump-to-cylinder fluid flow. For instance, conventional actuation of the hydraulic actuator can be achieved by substantially simultaneous, operator-controlled actuation of the valve device. Numerous less conventional operating modes can be achieved by actuation of a single valve device or actuation of various combinations of two or more valve devices.

For example, for a single valve device associated with a pressure monitoring system described herein, a proportional electromagnetic device of the pilot control assembly 14 of the valve device, such as, e.g., the PCHE valve device 242 or 410, can be energized. In the case of the valve device 242, in response to energization the second spring 76 can be compressed. The control spool 45 can be urged toward the proximal end 42 of the valve body 20 by the force of the third spring 96. As a result, the first land 70 can move axially toward the proximal end 42 such that the annular chamber 86 is opened to the pilot supply 290. The pilot supply 290 can be then in fluid communication with the proximal and distal control chambers 46, 47 by way of the transverse throughbore 88 and the longitudinal throughbore 80. Thus, the pilot supply pressure can be representative of the control chamber pressure.

The pressure of the fluid in the distal control chamber 47 acts on the proximal end 97 of the second land 55 urging the valve element 22 in the direction toward the distal end 44 of the valve body 20. As a result, the compressed load of the third spring 96 can be reduced, and the control spool 45 can be urged toward the distal end 44 of the valve body 20 by the force of the second spring 76. As the control spool 45 moves axially in the distal direction, the first land 70 of the control spool 45 can reduce the opening between the annular chamber 86 and the pilot supply 290. The opening between the annular chamber 86 and the pilot supply 290 and the opening between the annular chamber 86 and the tank 214 can be reduced until the control chambers 46, 47 hydraulically balance the control spool 45.

As the opening between the annular chamber 86 and the pilot supply 290 is reduced, the valve element 22 can be urged in the direction of the proximal end 42 by the first spring 66 and the metering slots 59 (if provided) can provide fluid communication between the annular cavities 50, 52. Then, the main pump 212 can provide pressurized fluid, via the load-hold check valve 286 and the inlet conduit 284, to the second annular cavity 52. From there, the pressurized fluid can be metered to the first annular cavity 50, which can direct the fluid to the cylinder conduit 280, which in turn can supply the fluid to the head end chamber 220 of the actuator 216.

Likewise, a CTHE valve device 240 may also be controlled with the aid of a proportional electromagnetic device 40. In the CTHE valve device 240, the metering slots 59 can provide communication between the annular cavities 50, 52. As a result, fluid in the cylinder conduit 280, received from the head end chamber 220, can be supplied to the tank 214. The rest of the operation is similar to what is described with the valve device 242. The PCRE valve device 244 and the CTRE valve device 246 function similarly to the PCHE valve device 242 and the CTHE valve device 240, respectively, but in relation to the rod end chamber 218 of the actuator 216.

Since the proximal and distal control chambers 46, 47 when pressurized are in communication with one another, the control spool 45 will not move since it is hydraulically-balanced. As a result, fluid flowing from the pilot supply 290 and into the distal control chamber 47 can be restricted. However, rather than flow becoming choked at the restriction, the pressure can act on the proximal end 97 of the valve element 22 through the distal control chamber 47 and moves the valve element 22 in a distal direction against the force of the first spring 66 and the flow is relieved to the tank 214 through the metering slots 59 (when provided).

In another example, a single pressure monitoring system described herein can be associated with more than one valve device or valve arrangement, such as described herein. Conventional movement of the actuator 216, such as, e.g., extension of a hydraulic cylinder, can be achieved by substantially simultaneous, operator-controlled actuation of the valve devices 242, 246, and retraction can be achieved by simultaneous operator controlled actuation of the valve devices 244, 240. For example, actuation of the valve device 242 can move its valve element 22 distally to establish fluid flow from the main pump 212 to the head end chamber 220, and actuation of the valve device 242 can move its valve element 22 distally to establish fluid flow from the rod end chamber 218 to the tank 214. Similarly, actuation of the valve device 244 can move its valve element 22 distally to establish flow from the main pump 212 to the rod end chamber 218, and actuation of the valve device 240 can move its valve element 22 distally to establish fluid flow from the head end chamber 220 to the tank 214.

It is contemplated that the valve devices 410, 510 formed with the axial passage 515, radial passages 525, 527, 529, the shuttle chamber 530, the internal bore 532, and the shuttle passage 534, incorporating the pressure compensating system 500 may be suitable as a PCHE or PCRE valve device. Moreover, it is contemplated that the valve devices 410, 510 formed without the axial passage 515, radial passages 525, 527, 529, the shuttle chamber 530, the internal bore 532, and the shuttle passage 534 may be suitable as a CTHE or CTRE valve device.

Generally, pressurized control fluid from the pilot pump or source is provided to the pilot control assembly at a design pressure, such as, e.g., up to about 4,200 kPa, for which the components of the pilot control assembly can withstand during normal operation. For example, the pump relief valve can be preset to this design pressure. However, the working chamber W of the valve device 12, 240, 242, 244, 246, 410, 510 or valve arrangement 312, 314, 316 is configured for fluid working pressures of up to about 37,000 to 40,000 kPa. Hence, the dynamic seal 58 or 454 is configured to separate these chambers of widely differing fluid pressures. When the dynamic seal 58 or 454 begins to wear, the high pressure fluid from the working chamber W can tend to leak in the low pressure chamber, thereby causing a pressure rise within the control chamber (control chambers 46 and/or 47 in FIG. 1 or control chambers 418 and/or 488 in FIG. 4).

The pilot relief valves of the valve device 12, 240, 242, 244, 246, 410, 510 or valve arrangement 312, 314, 316 may be operable to maintain its position in the first closed position when the fluid pressure in at least one of the control chambers (control chambers 46 and/or 47 in FIG. 1 or control chambers 418 and/or 488 in FIG. 4) of the pilot control assembly is below a predetermined threshold. The predetermined threshold pressure can be generally greater than the design pressure, such as, e.g., 5,000 kPa. For example, the pilot relief valve can be preset to this predetermined threshold pressure. When the control fluid pressure is at or above the predetermined threshold pressure, the pilot relief valve is moved to its second open position. When in the second open position, the fluid within the drain passage can be drained to the tank. To this end, the pump relief valve will move to its open position prior to the pilot relief valve, thereby allowing the downstream pressure of the corresponding pilot supply segment to build up to the predetermined threshold pressure of the pilot relief valve.

The pressure sensor 112, when provided, can be operable to sense or measure the fluctuating fluid pressure representative of at least one of the control chambers (control chambers 46 and/or 47 in FIG. 1 or control chambers 418 and/or 488 in FIG. 4) of the pilot control assembly of the valve device 12, 240, 242, 244, 246, 410, 510 or valve arrangement 312, 314, 316. The controller 115 may receive signals from the pressure sensor indicative of sensed control fluid pressure via the communication line. The controller 115 may compare the sensed control fluid pressure with a preset threshold pressure or range, such as, e.g., 4200 kPa and above. In one example, the preset threshold pressure can be set based on the settings of the pump relief valve and the pilot relief valve, that is, a pressure greater than the pressure limit of the pump relief valve and less than the pressure limit of the pilot relief valve. For instance, the preset threshold pressure can be set at, e.g., about 4900 kPa, or in the range of, e.g., 4200 to 4900 kPa, for monitoring by the operator. If the sensed control fluid pressure is greater than the preset threshold pressure, the controller 115 can be configured to communicate a warning signal via an audio and/or visual indicator 124, such as an operator interface. The controller 115 may be configured to filter signal or have software triggers such that the sensed pressure is greater than the threshold pressure for a period of time to avoid faulty pressure spike readings.

In view of the above, it is readily apparent that the systems and methods described herein can provide an improved and simplified mitigation and/or detection of dynamic seal wear. However, it is apparent that the systems and methods can be operable without a dynamic seal as can be appreciated by those skilled in the art. This can provide fast detection and notification to the operator of a potential failure prior to its occurrence, without comprising the system's integrity or construction. Moreover, the structure of the assembly is relatively uncomplicated, and can be used for retrofit.

It will be apparent to those skilled in the art that various modifications and variations can be made in the disclosed systems without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims and their equivalents.

What is claimed is:

1. A system, comprising:
   a first valve device and a second valve device, each of the first valve device and the second valve device including:
   a valve body and a valve element slidably disposed within a passageway formed in the valve body, wherein a first segment of the valve element and the valve body are arranged to define a working chamber to receive fluid at a first pressure, and the valve body and the valve element are arranged to define a control chamber to receive fluid at a second pressure, the valve element having a first land and a second land axially spaced from one another, the valve element including a retainer proximal to the first and second lands, wherein a spring is disposed around the retainer;
   a check stem disposed about a portion of the first land of the valve element, the check stem having an enlarged portion extending radially beyond the second land into the working chamber to selectively interface with a portion of a body inner surface of the valve body;
   a sleeve disposed about a portion of the second land of the valve element, the sleeve fixedly engaged to the body inner surface of the valve body, wherein an outer diameter of the sleeve is greater than an outer diameter of the check stem;
   an annular seal element disposed about the second land between the second land and a sleeve inner surface of the sleeve, wherein the annular seal element and the second land together are arranged to separate the working chamber and the control chamber and to move with axial movement of the valve element relative to the sleeve;

an axial passage formed within the valve element spaced from the check stem; and a first radial passage, a second radial passage and a third radial passage formed within the valve element spaced from the check stem, each of the first radial passage, the second radial passage and the third radial passage extending radially from the axial passage;

a pressure compensating valve coupled to the working chamber of the first valve device and the working chamber of the second valve device via a supply fluid passage; and a shuttle valve fluidly coupled to the pressure compensating valve, wherein one of the first radial passage, the second radial passage, and the third radial passage of the first valve device is fluidly coupled to shuttle valve, and one of the first radial passage, the second radial passage, and the third radial passage of the second valve device is fluidly coupled to shuttle valve.

2. The system of claim 1, wherein the valve element of each of the first valve device and the second valve device further comprises:

a third land spaced from the first land and the second land;

wherein the first radial passage is disposed in the third land;

wherein the second radial passage is disposed in a reduced diameter portion of the valve element between the first land and the second land; and wherein the third radial passage is disposed in the first land proximal to the first radial passage.

3. The system of claim 2, wherein each of the first valve device and the second valve device further include that at least one of:

the first radial passage maintains fluid communication with the shuttle valve during movement of the valve element;

the second radial passage maintains fluid communication with the working chamber during movement of the valve element; and the third radial passage selectively communicates with the working chamber during movement of the valve element.

4. The system of claim 1, further including at least one of the following:

i) a pressure sensor associated with the control chamber of the first valve device and the second valve device; and a controller in communication with the pressure sensor, the controller configured to:

receive a signal indicative of the second pressure;

compare the second pressure with a predetermined pressure; and communicate a signal to an operator when the second pressure is at or above the predetermined pressure; and ii) a supply passage in communication with the control chamber of the first valve device and the second valve device and extending to a tank; a check valve coupled to the supply passage; and a relief valve coupled to the supply passage and disposed between the check valve and the control chamber of the first valve device and the second valve device.

* * * * *